No. 780,603. Patented January 24, 1905.

UNITED STATES PATENT OFFICE.

ABRAHAM M. DE SOLLA, OF SAN FRANCISCO, CALIFORNIA.

ARTICLE OF MANUFACTURE.

SPECIFICATION forming part of Letters Patent No. 780,603, dated January 24, 1905.

Application filed October 12, 1904. Serial No. 228,214.

*To all whom it may concern:*

Be it known that I, ABRAHAM M. DE SOLLA, a citizen of the United States of America, residing at San Francisco, county of San Francisco, and State of California, have invented certain new and useful Improvements in Articles of Manufacture; and I hereby declare the following to be a full, clear, and exact description of the same.

This invention relates to a new article of manufacture having constituents and qualities as hereinafter described.

The invention consists in a new substance made from the fibrous covering of cocoanuts, commonly called the "husk," ground or pulverized with the pollen therewith for use in a granular form or saturated and treated as hereinafter described when to be molded or pressed into blocks or shapes of any kind, coherence being gained by some suitable bond—such as silicate of soda, dextrin, glue, or other substance—to cause coherence and best accord with the purposes to which the new article of manufacture is to be applied.

The object and use of this substance are for various industrial purposes, especially heat insulation applied either to conserve or repel heat, to fill the interstices of metallic structures to prevent resonance, oxidation, the passage or circulation of air, for packing merchandise liable to fracture, and other analogous purposes.

In the preparation of the substance forming the subject of this application the shells of cocoanuts with their pollen are decorticated or disintegrated by the usual machine processes, then ground to different degrees of fineness, as may be required. If to be reduced to a plastic state, this comminuted material is then placed in a vat or suitable receptacle and when for refractory use is saturated with some adherent and drying solution, such as silicate of soda, in other cases with some drying elastic gum, such as dextrin or glue, when a degree of elasticity is not objectionable or is required. Coloring material can also be added, if preferred, for exposed uses; so, also, septic chemicals where sanitary use of the substance is intended. After this treatment the substance can be dried and left in a granular state or while plastic can be molded into any desired commercial form—such as cubes of any shape, slabs, cylinders, or webs—and in this or its granulated form be packed permanently into the interstices or spaces of structural work or otherwise applied, as before described.

The "pollen" herein mentioned as a constituent element of my improved manufacture is the pulverulent refuse of cocoanut-husks, an abundant waste product which has not hitherto been utilized, although eminently useful for the purpose to which I have applied it in conjunction with a suitable amount of fiber without other admixture, except a suitable binder.

Having thus described the nature and objects of my invention and the manner of its production, what I claim as new, and desire to secure by Letters Patent, is—

The herein-described new article of manufacture, consisting of the husks and pollen of cocoa-shells, comminuted, then saturated with a binding solution, then dried, and finally pressed into suitable shapes for industrial uses, as herein set forth.

In testimony whereof I have signed my name to this specification in the presence of two subscribing witnesses.

ABRAHAM M. DE SOLLA.

Witnesses:
ALFRED A. ENQUIST,
ELMER WICKES.